(No Model.) 2 Sheets—Sheet 1.

W. A. G. SCHÖNHEYDER.
WATER METER.

No. 377,641. Patented Feb. 7, 1888.

Witnesses.
Geo. H. Rea
Robert Everett

Inventor.
William A. G. Schönheyder.
By
James L. Norris.
Atty.

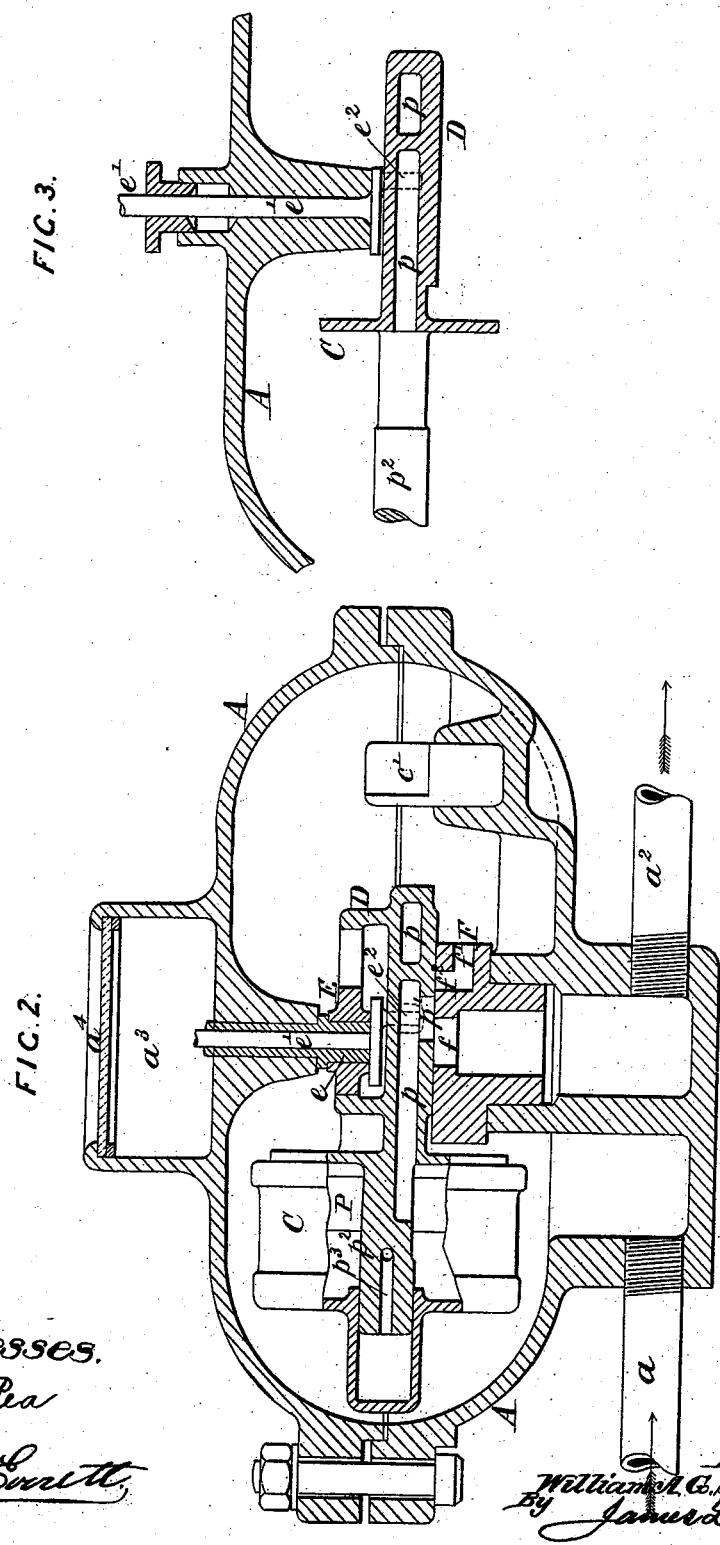

UNITED STATES PATENT OFFICE.

WILLIAM A. G. SCHÖNHEYDER, OF SHEPHERD'S BUSH, COUNTY OF MIDDLESEX, ENGLAND.

WATER-METER.

SPECIFICATION forming part of Letters Patent No. 377,641, dated February 7, 1888.

Application filed October 25, 1887. Serial No. 253,356. (No model.) Patented in England September 7, 1887, No. 12,124.

*To all whom it may concern:*

Be it known that I, WILLIAM ANTON GOTTLIEB SCHÖNHEYDER, a citizen of England, residing at Shepherd's Bush, in the county of Middlesex, England, have invented a new and useful Improved Liquid-Meter Applicable as an Engine, of which the following is a specification.

My invention relates to a simple and inexpensive construction of liquid-meter which can also be used as an engine and is readily accessible for cleansing or repair, as I shall now describe, referring to the accompanying drawings.

Figure 1:
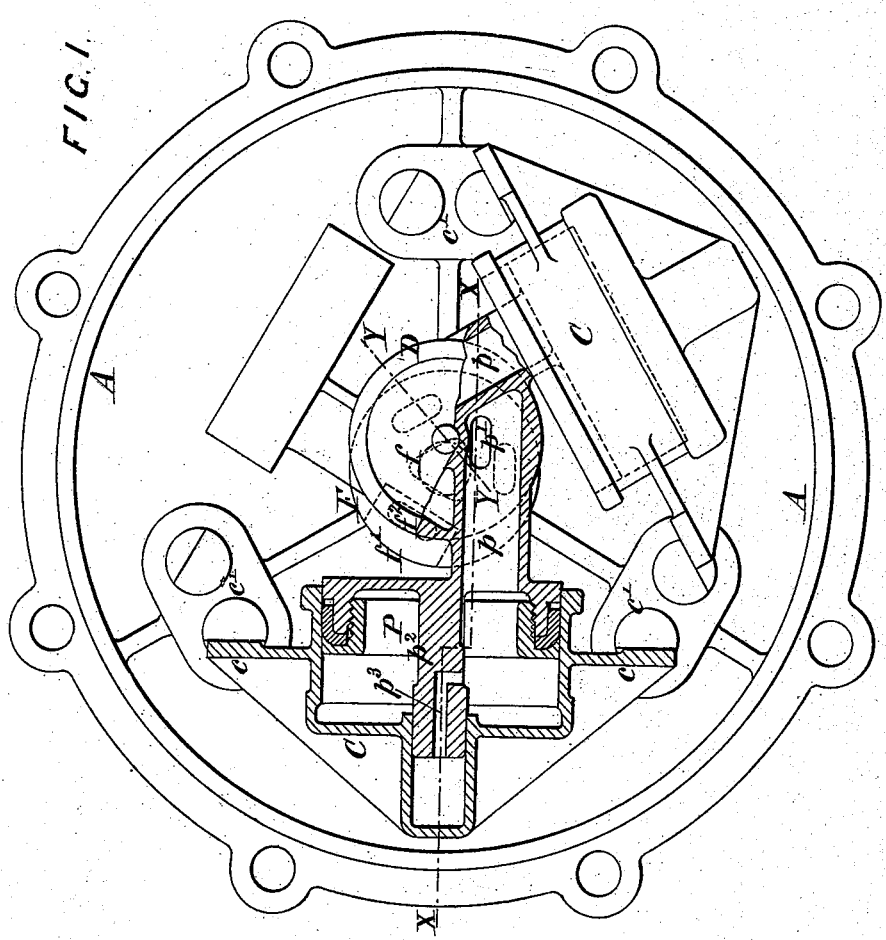
Figure 4:
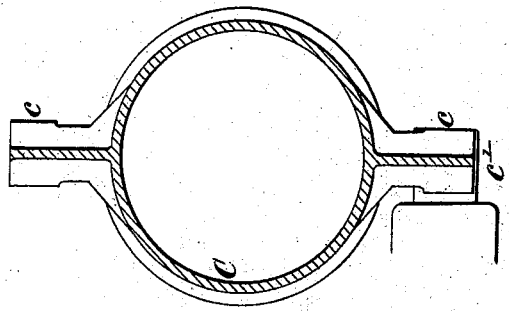

Figure 1 is a plan with the cover of the casing removed, part being shown in section. Fig. 2 is a section on the line X X and partly on Y Y of Fig. 1, showing the apparatus arranged to operate as a meter of water or other liquid. Fig. 3 is a detail section of the upper part of the casing, showing the modification to adapt the apparatus as a fluid-pressure engine. Fig. 4 is a transverse section of one of the cylinders.

A is a casing, made in two parts bolted together, so as to be tightly closed. The liquid that is to be measured or that is to operate as the working-fluid of the engine enters the casing by a pipe, $a$. The liquid, after working the meter or engine, is discharged by the pipe $a^2$. When the apparatus is used as a meter, a space, $a^3$, is provided in the cover of the casing to hold counter mechanism of any suitable kind, with its dials visible through a glass, $a^4$. When the apparatus is used as an engine, the shaft $e'$ passes through a stuffing-box in the cover, as shown in Fig. 3.

Within the casing there are three cylinders, C, each made with two side wings, $c$, which are faced so as to slide along the flat faces of guides $c'$, each cylinder being thus free to move to and fro transversely to its axis.

If desired, anti-friction rollers may be substituted for the flat guides $c'$, or may be interposed between the faces of the wings $c$ and the guides $c'$.

Each of the cylinders C is fitted with a packed piston, P, through the stem of which there is a passage, $p$, opening at one end into the cylinder and having at the other end a lateral mouth or port, $p'$. The piston has a stem, $p^2$, extending from it into a bore at the bottom of the cylinder, to serve as a guide for the piston, and through this stem is bored a hole, $p^3$, with a lateral mouth, to let liquid freely enter and leave the space in the bore beyond the end of the stem $p^2$. In the middle of the casing is fixed a facing, F, having through its center a triangularly-shaped hole or port, $f$, communicating with the discharge-pipe $a^2$. There are three recesses, $f'$, formed in the edge of the facing F, each with a mouth or port, $f^2$, nearly rectangular, presenting itself at the upper surface of the facing. The three pistons P are rigidly connected to a central boss, D, which bears upon and is free to slide along the upper surface of the facing F. When the apparatus is to be used as a meter, as shown in Fig. 2, a circular cavity is formed in the upper side of the boss D, and within this cavity a roller, E, of less diameter than the cavity, is fitted to revolve on a pin, $e$, projecting down from the cover of the casing. A spindle, $e'$, having at its lower end a crank-pin, $e^2$, engaged in a hole of the boss D, extends centrally up the pin $e$ into the space $a^3$, where it is geared to any suitable counter arranged in the space $a^3$.

When the apparatus is to be used as an engine or pump, the cavity in the boss D and the roller E are dispensed with, and a spindle, $e'$, having a crank, $e^2$, engaged in a hole of the boss D, extends through a stuffing-box to the outside of the casing, to operate as a driving-shaft.

Whether the apparatus be used as a meter or as an engine, the action of the parts is the same—that is to say, fluid under pressure being supplied to the interior of the casing A by the pipe $a$, while there is escape for fluid by the pipe $a^2$, the fluid in the casing presses on all the pistons P, tending to force them into their respective cylinders, while it also presses all the wings $c$ of the cylinders up against the guides $c'$ and presses the central boss, D, on the facing F. The boss D can move to and fro over the face F to a certain extent, limited by the throw of the crank $e^2$ or by the excess of the diameter of the cavity in D above that of the roller E, and it can also move to and fro transversely to the same extent. In this compound movement of the boss D each of the piston-ports $p'$ presents itself alternately to one of the ingress-ports $f^2$ of the facing and to the central egress-port, $f$, and this alternation occurs in respect of each of the pistons in regular succession, and these are consequently made to reciprocate in such order as to give the boss its required movement. The crank $e^2$ being thus caused to revolve, its spindle $e'$ gives motion to the gearing of the counter or to such external machinery as may be connected to it.

From the construction described it will be seen that the parts require very little labor in fitting, and that by removing the cover of the casing they can all be readily lifted out for cleansing or repairs, and can at once be dropped again into their respective places.

Obviously by a slight modification of form the relative position of each cylinder C and piston P might be inverted—that is to say, the three pistons might be made with side wings to bear against guides, such as $c'$, while the cylinders might be attached to the central boss, D.

Having thus described the nature of my invention and the best means I know of carrying it out in practice, I claim—

A liquid-meter adapted as a fluid-pressure engine, consisting of an air-tight casing, three cylinders free to move to and fro transversely, and each having side wings, $c$, to slide in guides $c'$, a packed piston, P, in each cylinder, and provided with a hollow stem having a port at its inner end, a central boss, D, in the casing, to which the piston-stems are all rigidly secured, said boss being movable over a fixed facing, said facing, boss, and piston-stems having ports, and a shaft, $e'$, passing through the casing and eccentrically engaging the boss, substantially as and for the purposes described.

In testimony whereof I have signed my name to this specification, in the presence of two subscribing witnesses, this 14th day of October, A. D. 1887.

W. A. G. SCHÖNHEYDER.

Witnesses:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*